United States Patent Office 3,349,090
Patented Oct. 24, 1967

3,349,090
POLYHALOGENATED DI-HYDROXYBENZAN-
ILIDE DERIVATIVES
Arthur William James Broome, Neville Stanton Crossley,
and William Glynne Moss Jones, Macclesfield, England, assignors to Imperial Chemical Industries Limited,
London, England, a corporation of Great Britain
No Drawing. Filed July 30, 1964, Ser. No. 386,450
Claims priority, application Great Britain,
Aug. 14, 1963, 32,129/63
4 Claims. (Cl. 260—268)

ABSTRACT OF THE DISCLOSURE

The disclosure relates to new polyhalogenated dihydroxybenzanilide derivatives which are active against liver fluke infestations in domestic animals. Representative of the disclosed compounds is 3,3', 5,5', 6-pentachloro-2,2'-di-hydroxybenzanilide.

---

This invention relates to organic compounds and more particularly it relates to new benzanilide derivatives which possess valuable therapeutic properties.

According to the invention we provide benzanilide derivatives of the formula:

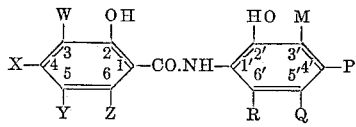

wherein W, X, Y, Z, M, P, Q and R, which may be the same or different, stand for hydrogen, chlorine or bromine provided that not more than two of W, X, Y, and Z and not more than two of M, P, Q and R stand for hydrogen, and the pharmaceutically acceptable salts thereof, but excluding 3,3',5,5'-tetrachloro-2,2'-dihydroxybenzanilide.

Particularly valuable benzanilide derivatives of the invention are, for example, 3,3',5,5',6'-pentachloro-2,2'-dihydroxybenzanilide, 3,3',5,5',6 - pentachloro - 2,2' - dihydroxybenzanilide, 3,3',5,5',6,6'-hexachloro-2,2'-dihydroxybenzanilide and 3,3',4',5,5',6,6' - heptachloro - 2,2' - dihydroxybenzanilide.

Suitable pharmaceutically-acceptabe salts of the benzanilide derivatives of the invention are, for example, alkali metal, and alkaline earth metal salts such as the sodium and calcium salts, and the salts of non-toxic organic bases, for example piperazine.

According to a further feature of the invention we provide a process for the manufacture of the benzanilide derivatives of the invention which comprises the interaction of a carboxylic acid of the formula:

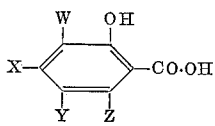

wherein W, X, Y and Z have the meanings stated above, or a reactive derivative thereof, and an aminophenol derivative of the formula:

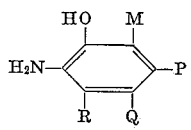

wherein M, P, Q and R have the meanings stated above.

As suitable reactive derivatives of the said carboxylic acid there may be mentioned, for example, the corresponding carboxylic acid halides, for example the corresponding carboxylic acid chloride, for example 3,5-dichlorosalicyloyl chloride, and reactive esters, for example 4-nitrophenyl esters and 2,4,5-trichlorophenyl esters.

The interaction may conveniently be carried out in the presence of a diluent or solvent, for example benzene, toluene, xylene, diethyl ether, cyclohexane, diisobutylene, tetrahydrofuran, dimethylformamide and di-n-butyl ether, and it may be accelerated or completed by the application of heat.

The interaction may optionally be carried out in the presence of a base, for example pyridine, triethylamine, N:N-dimethylaniline or an excess of the said aminophenol derivative.

The interaction may also optionally be carried out in the presence of an inorganic catalyst, for example aluminium chloride or titanium chloride.

The interaction between the said carboxylic acid and the said aminophenol derivative may optionally be carried out in the presence of a dehydrating agent, for example N:N'-dicyclohexylcarbodiimide.

The reactive derivatives of the said carboxylic acid may conveniently be prepared in the form of a solution in an inert solvent and the solution thus obtained may conveniently be used in the process defined above without purification or isolation of the reactive derivative of the said carboxylic acid. Thus the said carboxylic acid may be converted into a reactive derivative by interaction with, for example, thionyl chloride, phosphorus trichloride or phosphorus tribromide in the presence of an inert solvent such as benzene and a base such as pyridine, and the solution of the reactive derivative thus obtained may be used in the above process for the manufacture of the benzanilide derivatives of the invention. The benzanilide derivatives of the invention are effective in removing helminths, for example liver fluke, from laboratory and domestic animals.

The invention is illustrated but not limited by the following examples in which the parts are by weight:

Example 1

A mixture of 6.2 parts of 3,5-dichlorosalicylic acid, 3.6 parts of thionyl chloride, 35 parts of benzene and 0.1 part of pyridine is heated under reflux for 0.5 hour. The resulting solution is cooled and 6.4 parts of 2-amino-3,4,6-trichlorophenol are then added. The mixture is heated under reflux for 16 hours and is then cooled and filtered. The solid residue thus obtained is stirred with 20 parts of a 9% aqueous solution of sodium bicarbonate and the mixture is then filtered. The solid residue thus obtained is crystallised from o-dichlorobenzene and threre is thus obtained 3,3',5,5',6' - pentachloro-2,2'-dihydroxybenzanilide, M.P. 224° C.

Example 2

The process described in Example 1 is repeated except that the 6.2 parts of 3,5-dichlorosalicylic acid and the 6.4 parts of 2-amino-3,4,6-trichlorophenol are replaced by molecular equivalent amounts of the appropriately substituted salicylic acid and the appropriately substituted 2-aminophenol respectively.

There are thus obtained 3,3',5,5',6-pentachloro-2,2'-dihydroxybenzanilide, M.P. 209–211° C., 3,3',5,5',6,6'-hexachloro-2,2'-dihydroxybenzanilide, M.P. 226° C., 3,3',4',5,5',6,6' - heptachloro-2,2'-dihydroxybenzanilide, M.P. 243° C., 4 - bromo - 3,3',5,5',6,6' - hexachloro-2,2'-dihydroxybenzanilide, M.P. 264° C., 3,3',4',5,5',6'-hexachloro-2,2'-dihydroxybenzanilide, M.P. 215–216° C., 3,4',5,5',6-pentachloro-2,2'-dihydroxybenzanilide M.P. 278° C., 3,5-dibromo - 3',5',6' - trichloro - 2,2' - dihydroxybenzanilide, M.P. 239° C., 3,3',5,5'-tetrabromo - 2,2' - dihydroxybenzanilide, M.P. 233° C. and 3,5-dibromo-3',5'-dichloro-2,2'-dihydroxybenzanilide, M.P. 240° C.

Example 3

21 parts of 3,5-dichlorosalicyloyl chloride are added gradually to a stirred suspension of 21 parts of 2-amino-3,4,6-trichlorophenol in 100 parts of toluene, and when the addition is completed the mixture is stirred at 100° C. for 16 hours. The reaction mixture is cooled and filtered and the solid residue is stirred with water and then with a 5% aqueous solution of sodium bicarbonate. The residue thus obtained is crystallised from o-dichlorobenzene and there is thus obtained 3,3',5,5',6'-pentachloro-2,3'-dihydroxybenzanilide, M.P. 224° C.

Example 4

4.6 parts of sodium are added in small portions to 500 parts of methanol, and to the solution of sodium methoxide in methanol thus obtained there is added 43.6 parts of 3,3',5,5',6,6'-hexachloro-2,2'-dihydroxybenzanilide. The mixture is stirred until the suspended solid has dissolved and the solution is then evaporated under reduced pressure. There is thus obtained, as a solid residue, the di-sodium salt of 3,3',5,5',6,6'-hexachloro-2,2'-dihydroxybenzanilide.

Example 5

A solution of 5 parts of calcium chloride in 20 parts of water is added to a solution of 10 parts of the disodium salt of 3,3',5,5',6,6'-hexachloro-2,2'-dihydroxybenzanilide in 100 parts of water and the mixture is stirred until the precipitation of solid from the solution is complete. The mixture is then filtered and the solid residue is washed with water and dried at 50° C. There is thus obtained the calcium salt of 3,3',5,5',6,6'-hexachloro-2,2'-dihydroxybenzanilide.

Example 6

20 parts of piperazine hexahydrate are added to a solution of 40 parts of 3,3',5,5',6,6'-hexachloro-2,2'-dihydroxybenzanilide in 300 parts of methanol, and the solution thus obtained is kept at ambient temperature until the precipitation of solid from the solution is substantially complete. The mixture is then filtered and the solid residue is washed with methanol and then dried. There is thus obtained the mono-piperazine salt of 3,3',5,5',6,6'-hexachloro-2,2'-dihydroxybenzanilide.

Example 7

A mixture of 10.75 parts of 3,5,6-trichlorosalicylic acid, 3.1 parts of thionyl chloride and 50 parts of dry benzene is heated under reflux for 30 minutes. To the resulting clear solution is added a solution of 4 parts of triethylamine and 7.2 parts of 2-amino - 4,6 - dichlorophenol in 15 parts of dry benzene. The mixture is heated under reflux for twelve hours, cooled and then extracted with 100 parts of a 5% aqueous solution of sodium hydroxide. The alkaline extract is acidified with 5% hydrochloric acid and the precipitated solid is collected by filtration, washed successively with water, saturated sodium bicarbonate solution and acetic acid. The residual solid thus obtained is crystallised from glacial acetic acid. There is thus obtained 3,3',5,5',6-pentachloro-2,2'-dihydroxybenzanilide, M.P. 209° C.

Example 8

A solution of 48.6 parts of 3,5,6-trichlorosalicylic acid and 35.6 parts of 2-amino-4,6-dichlorophenol in 400 parts of dry tetrahydrofuran is cooled in an ice bath and stirred while a solution of 40.8 parts of dicyclohexylcarbodiimide in 100 parts of tetrahydrofuran is added during 2 hours. The resulting mixture is then stirred at 18° C. for a further 12 hours and the mixture is then filtered. The filtrate is evaporated to dryness and the solid residue thus obtained is crystallised from acetic acid. There is thus obtained 3,3',5,5',6-pentachloro-2,2'-dihydroxybenzanilide, M.P. 209° C.

Example 9

A mixture of 48.3 parts of 3,5,6-trichlorosalicylic acid, 22 parts of thionyl chloride and 400 parts of dry toluene is stirred and heated under reflux for 45 minutes. Toluene is then distilled from the reaction mixture under reduced pressure until the mixture has about one third of its original volume. To this mixture are added 25 parts of pyridine and a solution of 35 parts of 2-amino-4,6-dichlorophenol in 250 parts of warm toluene. The resulting mixture is stirred and heated under reflux for sixteen hours. The mixture is then evaporated under reduced pressure until it has about one third of its original volume and is then cooled and filtered. The solid residue is washed with a saturated solution of sodium bicarbonate and with water, and is then crystallised from acetic acid. There is thus obtained 3,3',5,5',6-pentachloro-2,2'-dihydroxybenzanilide, M.P. 209° C.

Example 10

A mixture of 3.6 parts of 2-amino-4,6-dichlorophenol, 5.8 parts of 3,5,6-trichlorosalicylic acid and 40 parts of dry toluene is stirred and heated at 90–95° C. while 2.2 parts of thionyl chloride are gradually added over 45 minutes. The mixture is then stirred and heated under reflux for sixteen hours. The reaction mixture is evaporated under reduced pressure and the residue thus obtained is extracted with 40 parts of warm ethanol. 10 parts of water and 1 part of activated charcoal are added to the ethanolic extract and the mixture thus obtained is then filtered. 20 parts of water are added to the filtrate and the solid thus precipitated is collected by filtration, washed with saturated sodium bicarbonate solution and then with water and is then crystallised from acetic acid. There is thus obtained 3,3',5,5',6-pentachloro-2,2'-dihydroxybenzanilide, M.P. 209° C.

Example 11

The process described in Example 4 is repeated except that 43.6 parts of 3,3',5,5',6,6'-hexachloro-2,2'-dihydroxybenzanilide are replaced by 40.1 parts of 3,3',5,5',6-pentachloro-2,2'-dihydroxybenzanilide. There is thus obtained as a white solid the di-sodium salt of 3,3',5,5',6-pentachloro-2,2'-dihydroxybenzanilide.

Example 12

The process described in Example 5 is repeated except that 10 parts of the di-sodium salt of 3,3',5,5',6,6'-hexachloro-2,2'-dihydroxybenzanilide are replaced by 9.2 parts of the di-sodium salt of 3,3',5,5',6-pentachloro-2,2'-dihydroxybenzanilide. There is thus obtained as a white solid the calcium salt of 3,3',5,5',6-pentachloro-2,2'-dihydroxybenzanilide.

Example 13

The process described in Example 6 is repeated except that 40 parts of 3,3', 5,5',6,6'-hexachloro-2,2'-dihydroxybenzanilide are replaced by 38 parts of 3,3',5,5',6-pentachloro-2,2'-dihydroxybenzanilide. There is thus obtained as a buff-coloured solid the mono-piperazine salt of 3,3',5,5',6-pentachloro-2,2'-dihydroxybenzanilide.

Example 14

A mixture of 10 parts of 4'-nitrophenyl 3,5,6-trichlorosalicylate, 9.8 parts of 2-amino-4,6-dichlorophenol and 120 parts of dimethylformamide is heated at 100° C. for 20 hours. The solution thus obtained is poured while warm onto 1000 parts of ice, and the precipitated solid thus obtained is crystallised from acetic acid in the presence of animal charcoal. There is thus obtained 3,3',5,5',6-pentachloro-2,2'-dihydroxybenzanilide, M.P. 209° C.

4'-nitrophenyl 3,5,6-trichlorosalicylate used as starting material in the above process may be obtained as follows:

A mixture of 12.1 parts of 3,5,6-trichlorosalicylic acid, 7 parts of 4-nitrophenol, 3.5 parts of phosphorus pentachloride and 75 parts of xylene is heated under reflux for 3½ hours. The solution thus obtained is kept at 18° C.

for 16 hours and is then submitted to steam distillation. The residual solid thus obtained is triturated with aqueous sodium bicarbonate solution and crystallised from benzene. There is thus obtained 4'-nitrophenyl 3,5,6-trichlorosalicylate, M.P. 178° C.

*Example 15*

A mixture of 3.6 parts of 4'-nitrophenyl 3,5-dibromosalicylate and 3.0 parts of 2-amino-4,6-dichlorophenol and 90 parts of dimethylformamide is heated at 100° C. for 20 hours. The solution thus obtained is poured while warm onto 300 parts of ice and the precipitated solid is crystallised from benzene or methanol to give 3,5-dibromo - 3',5' - dichloro - 2,2' - dihydroxybenzanilide, M.P. 240° C.

4'-nitrophenyl 3,5-dibromosalicylate, M.P. 243° C., used as starting material in the above process may be obtained in a similar manner to that described for 4'-nitrophenyl 3,5,6-trichlorosalicylate in Example 14.

*Example 16*

A mixture of 12 parts of 3,5,6-trichlorosalicylic acid, 2.5 parts of phosphorus trichloride and 24 parts of toluene is heated under reflux for 2 hours. 8 parts of 2-amino-4,6-dichlorophenol are then added to the reaction mixture and the resulting mixture is stirred and heated under reflux for twelve hours. The mixture is cooled and filtered and the solid residue is washed with water and then with saturated aqueous sodium bicarbonate solution. The solid residue is then crystallised from acetic acid. There is thus obtained 3,3',5,5',6 - pentachloro - 2,2' - dihydroxybenzanilide, M.P. 209–211° C.

*Example 17*

A mixture of 6 parts of 3,5,6-trichlorosalicylic acid, 4 parts of phosphorus trichloride and 24 parts of toluene is heated under reflux for thirty minutes. 8 parts of 2-amino-4,6-dichlorophenol are added to the reaction mixture and the mixture thus obtained is heated under reflux with stirring for sixteen hours and is then cooled and filtered. The solid residue is recrystallised from acetic acid. There is thus obtained 3,3',5,5',6-pentachloro-2,2'-dihydroxybenzanilide, M.P. 209–211° C.

What we claim is:

1. A benzanilide derivative of the formula:

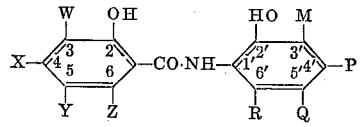

wherein W, X, Y, Z, M, P, Q and R are selected from hydrogen, chlorine and bromine, provided that at least two of W, X, Y and Z are selected from chlorine and bromine, and that at least two of M, P, Q and R are selected from chlorine and bromine, and that at least five of W, X, Y, Z, M, P, Q and R are selected from chlorine and bromine, and the pharmaceutically-acceptable salts thereof.

2. A benzanilide derivative as claimed in claim 1 selected from the group consisting of 3,3',5,5',6'-pentachloro-2,2'-dihydroxybenzanilide, 3,3',5,5',6-pentachloro-2,2'-dihydroxybenzanilide, 3,3',5,5',6,6'-hexachloro-2,2'-dihydroxybenzanilide and 3,3',4',5,5'-6,6'-heptachloro-2,2'-dihydroxybenzanilide.

3. A pharmaceutically-acceptable salt of a benzanilide derivative as claimed in claim 1 which is selected from the group consisting of alkali metal and alkaline earth metal salts of the said benzanilide derivatives and salts of the said benzanilide derivatives with non-toxic organic bases.

4. A pharmaceutically-acceptable salt of a benzanilide derivative as claimed in claim 3 which is selected from the group consisting of sodium, calcium and piperazine salts of the said benzanilide derivatives.

References Cited

FOREIGN PATENTS 1,066,216   6/1954   France.

HENRY R. JILES, *Acting Primary Examiner.*